(12) United States Patent
Kawabata et al.

(10) Patent No.: US 11,692,558 B2
(45) Date of Patent: Jul. 4, 2023

(54) STRADDLED VEHICLE

(71) Applicant: YAMAHA HATSUDOKI KABUSHIKI KAISHA, Iwata (JP)

(72) Inventors: Tomohiro Kawabata, Shizuoka (JP); Mao Akita, Shizuoka (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 0 days.

(21) Appl. No.: 17/541,913

(22) Filed: Dec. 3, 2021

(65) Prior Publication Data
US 2022/0205454 A1  Jun. 30, 2022

(30) Foreign Application Priority Data

Dec. 29, 2020 (JP) ................................ 2020-219793

(51) Int. Cl.
| | |
|---|---|
| *F04D 29/40* | (2006.01) |
| *B62M 7/02* | (2006.01) |
| *B62K 19/30* | (2006.01) |
| *F04D 29/54* | (2006.01) |
| *F04D 29/42* | (2006.01) |
| *F04D 29/44* | (2006.01) |
| *B62K 11/04* | (2006.01) |

(52) U.S. Cl.
CPC ............ *F04D 29/403* (2013.01); *B62K 11/04* (2013.01); *B62K 19/30* (2013.01); *B62M 7/02* (2013.01); *F04D 29/4226* (2013.01); *F04D 29/442* (2013.01); *F04D 29/541* (2013.01)

(58) Field of Classification Search
CPC .. F04D 29/403; F04D 29/4226; F04D 29/442; F04D 29/541; B62K 11/04; B62K 19/30; B62M 7/02
See application file for complete search history.

(56) References Cited

U.S. PATENT DOCUMENTS

| | | | | |
|---|---|---|---|---|
| 4,709,774 | A * | 12/1987 | Saito .................... | B62J 17/02 |
| | | | | 180/68.1 |
| 6,269,896 | B1 * | 8/2001 | Tanaka .................. | B60K 11/04 |
| | | | | 280/288.4 |
| 7,387,180 | B2 * | 6/2008 | Konno ................... | B62J 17/10 |
| | | | | 180/219 |
| 2019/0063301 | A1 * | 2/2019 | Morotomi ............. | B60K 13/04 |

FOREIGN PATENT DOCUMENTS

JP          3154590 U     10/2009

* cited by examiner

*Primary Examiner* — Syed O Hasan
(74) *Attorney, Agent, or Firm* — Rabin & Berdo, P.C.

(57) ABSTRACT

A straddled vehicle including a radiator, a radiator fan disposed behind the radiator and configured to generate air passing through the radiator and flowing rearward, a fan cover disposed behind the radiator fan and including a lateral blowing port configured to blow out sidewards the air flowing rearward from the radiator, a side cover covering the radiator laterally and having an opening formed therein, an inner panel disposed between the side cover and the radiator, to thereby define an accommodation space between the inner panel and the side cover, and an electrical component disposed in the accommodation space. The inner panel includes a slope that is located rearward of the radiator, slants with respect to aright-and-left direction of the straddled vehicle, is configured to lead the air blown out from the lateral blowing port to the opening in the side cover, and divides the accommodation space.

9 Claims, 10 Drawing Sheets

STRADDLED VEHICLE

CROSS-REFERENCE TO RELATED APPLICATIONS

This application is based on, and claims priority from, Japanese Patent Application No. 2020-219793, filed on Dec. 29, 2020. The contents of the application is incorporated herein by reference.

BACKGROUND

Field of the Invention

The present invention relates to a straddled vehicle.

Background Information

There is a type of straddled vehicle including side covers, inner panels, and a radiator. For example, Publication of Japan Registered Utility Model No. 3154590 describes a straddled vehicle, in which right and left inner panels are disposed on the inner side of right and left side covers. Besides, a radiator is disposed between the right and left inner panels. Each side cover includes an opening disposed behind the radiator. When air passes through the radiator, cooling water contained in the radiator is cooled. The air gets hot, while passing through the radiator. The hot air then flows rearward from the radiator and is discharged to outside through the opening.

SUMMARY

In the straddled vehicle described above, the hot air flows rearward from the radiator. Because of this, when an electrical component is designed to be disposed behind the radiator, the electrical component becomes likely to be thermally affected. Besides, a space is produced between each side cover and each inner panel. When the space is utilized as an accommodation space for disposing an electrical component, chances are that the hot air, flowing from the radiator, reversely flows forward and intrudes the accommodation space. In this case, it is inevitable that the electrical component is thermally affected. It is an object of the present invention to inhibit an electrical component disposed behind a radiator and an electrical component that disposed in an accommodation space produced on the inner side of an inner panel from being thermally affected, and simultaneously, efficiently discharge hot air, flowing from the radiator, to outside.

A straddled vehicle according to an aspect of the present invention includes a side cover, a radiator, a radiator fan, a fan cover, an inner panel, and an electrical component. The side cover includes an opening. The radiator is laterally covered with the side cover. The radiator fan is disposed behind the radiator. The radiator fan generates a flow of air passing through the radiator from front to rear. The fan cover is disposed behind the radiator fan. The fan cover includes a lateral blowing port. The lateral blowing port blows out sidewards the air flowing rearward from the radiator. The inner panel produces an accommodation space together with the side cover therebetween. The inner panel is disposed between the side cover and the radiator. The electrical component is disposed in the accommodation space. The inner panel includes a slope slanting with respect to a vehicle right-and-left direction. The slope is located rearward of the radiator. The slope leads the air blown out from the lateral blowing port to the opening. The slope divides the accommodation space and a space located behind the radiator.

In the straddled vehicle according to the present aspect, the air, getting hot while passing through the radiator, is blown out sidewards by the lateral blowing port of the fan cover. Because of this, even when an electrical component is disposed behind the radiator, the electrical component can be inhibited from being thermally affected. Besides, the hot air, blown out sidewards from the lateral blowing port, is led to the opening of the side cover by the slope of the inner panel. Accordingly, the hot air, passing through the radiator, is efficiently discharged to outside through the opening. Moreover, the accommodation space for the electrical component is divided from the space located behind the radiator by the slope. Because of this, the hot air, passing through the radiator, is prevented from intruding the accommodation space. Accordingly, the electrical component, disposed inside the accommodation space, can be inhibited from being thermally affected.

The inner panel may extend from forward of the radiator to rearward of the radiator. The inner panel may lead the air to the radiator from ahead of the radiator. In this case, the air is efficiently led to the radiator by the inner panel.

The lateral blowing port may be at least in part located forward of the opening. The lateral blowing port may at least in part overlap the side cover. In this case, the lateral blowing port is at least in part located forward of the opening. Hence, the air, blown out from the lateral blowing port, is unlikely to flow to the opening. Despite this, the air can be herein efficiently led to the opening by the slope of the inner panel.

The straddled vehicle may further include an engine. The side cover may laterally cover at least part of the engine. In this case, the air is unlikely to be discharged to outside because of the slide cover having a large size. Despite this, the hot air, passing through the radiator, can be herein efficiently discharged by the slope and the opening.

The opening may be opened sidewards from the vehicle. The engine may be at least in part exposed to outside through the opening in a vehicle side view. In this case, engine heat is easily discharged through the opening. Besides, the hot air, passing through the radiator, is easily discharged by utilizing the opening.

The lateral blowing port may at least in part overlap the opening in a vehicle side view. In this case, the hot air, passing through the radiator, is efficiently discharged by utilizing the opening.

The inner panel may further include an extending portion extending rearward from an upper portion of the slope. In this case, the hot air, passing through the radiator, can be prevented from reversely flowing forward from above the slope by the extending portion.

The fan cover may further include a cover body and a duct portion. The cover body may cover the radiator fan. The duct portion may include the lateral blowing port. The duct portion may extend from the cover body to the opening.

The slope may overlap at least part of the radiator fan in a vehicle side view. In this case, the air, fed from the radiator fan, is efficiently guided by the slope.

DETAILED DESCRIPTION OF EMBODIMENTS

Figure 1:
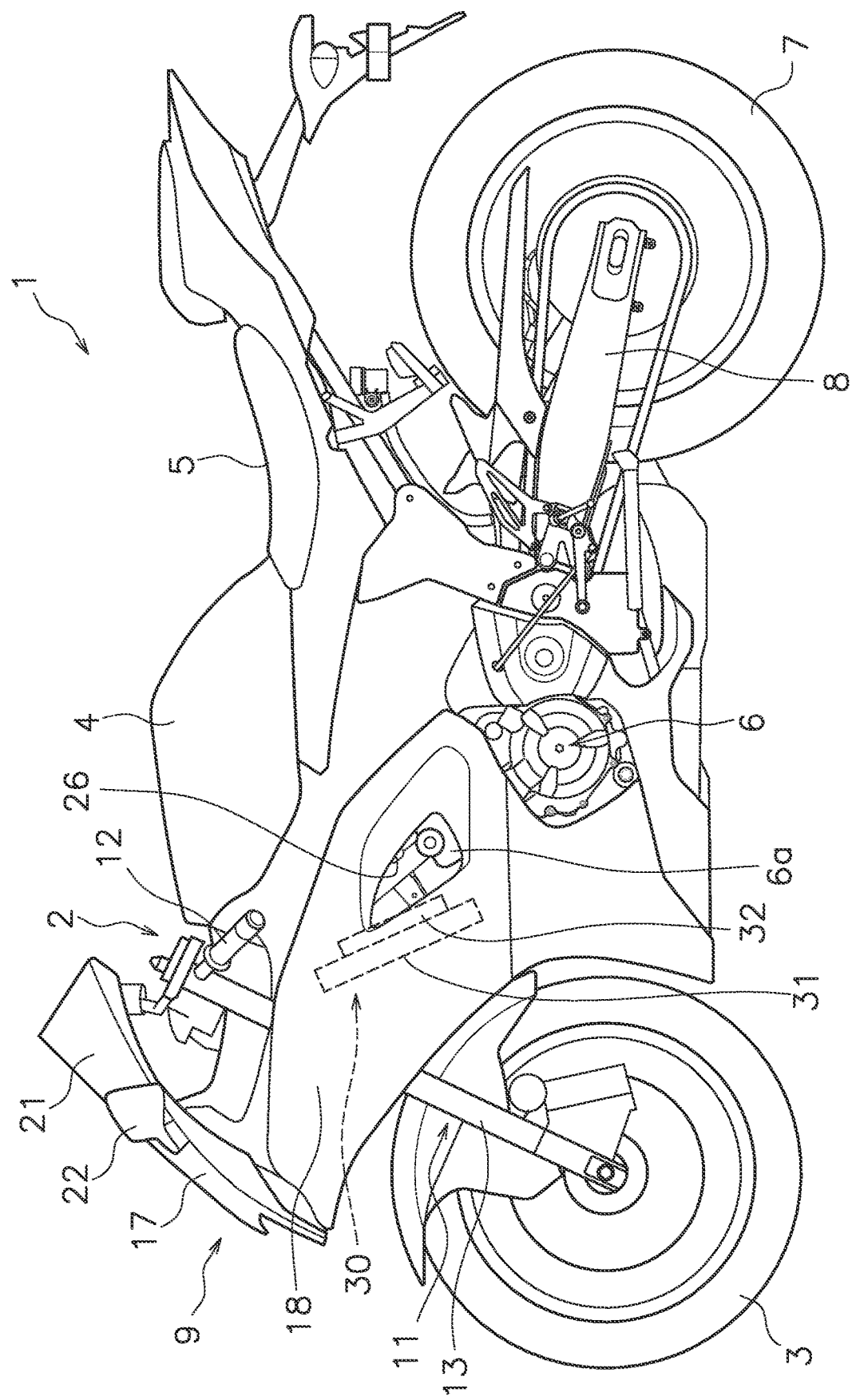
FIG. 1 is a side view of a straddled vehicle according to an embodiment.
Figure 2:
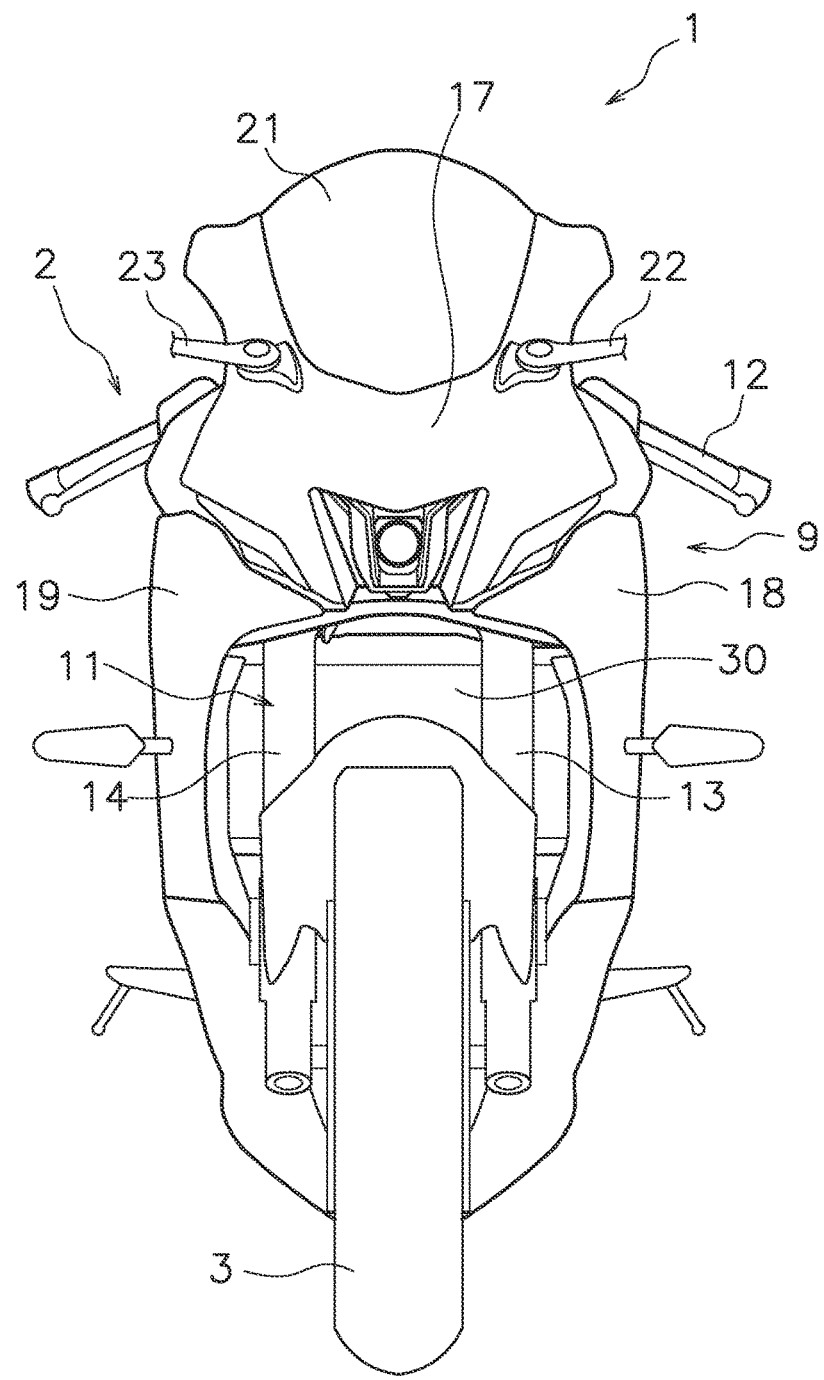
FIG. 2 is a front view of the straddled vehicle.

A straddled vehicle according to an embodiment will be hereinafter explained with reference to drawings. FIG. 1 is a side view of a straddled vehicle 1 according to the embodiment FIG. 2 is a front view of the straddled vehicle 1. As shown in FIG. 1, the straddled vehicle 1 includes a steering device 2, a font wheel 3, a fuel tank 4, a seat 5, an engine 6, arear wheel 7, arear arm 8, and a vehicle body cover 9. It should be noted that in the present embodiment, the terms "front", "rear", "right", and "left" are defined as meaning front, rear, right, and left directions seen from a rider seated on the seat 5.

The steering device 2 is steered by the rider. The steering device 2 includes a front fork 11 and a handle member 12. The front fork 11 supports the front wheel 3 such that the front wheel 3 is made rotatable. The handle member 12 is connected to the font fork 11. As shown in FIG. 2, the front fork 11 includes a first suspension 13 and a second suspension 14.

The fuel tank 4 is disposed behind the handle member 12. The seat 5 is disposed behind the fuel tank 4. The engine 6 is disposed between the front wheel 3 and the rear wheel 7. The engine 6 is disposed below the fuel tank 4. The engine 6 generates a drive force for rotating the rear wheel 7. The rear wheel 7 is disposed behind the engine 6. The rear wheel 7 is rotatably supported by the rear arm 8.

The vehicle body cover 9 includes a front cover 17, a first side cover 18, and a second side cover 19. The straddled vehicle 1 according to the present embodiment is a motorcycle of so-called a full fairing type. The front cover 17 is disposed in front of the steering device 2. A wind shield 21 is attached to the front cover 17. Rear-view mirrors 22 and 23 are attached to the front cover 17.

The first and second side covers 18 and 19 extend rearward from the front cover 17. The first and second side covers 18 and 19 laterally cover the steering device 2 and the engine 6. As shown in FIG. 1, the first side cover 18 overlaps at least part of the steering device 2 in the vehicle side view. The first side cover 18 overlaps at least part of the engine 6. The first side cover 18 extends from a position higher than the front wheel 3 to a position lower than the center of the front wheel 3. The first side cover 18 includes a first opening 26. The first opening 26 is opened sidewards from the vehicle. The first opening 26 is at least in part located directly below the fuel tank 4. The first opening 26 is at least in part located higher than the engine 6. A portion 6a of the engine 6 is exposed to outside through the first opening 26 in the vehicle side view. The second side cover 19 has a similar structure to the first side cover 18.

Figure 3:
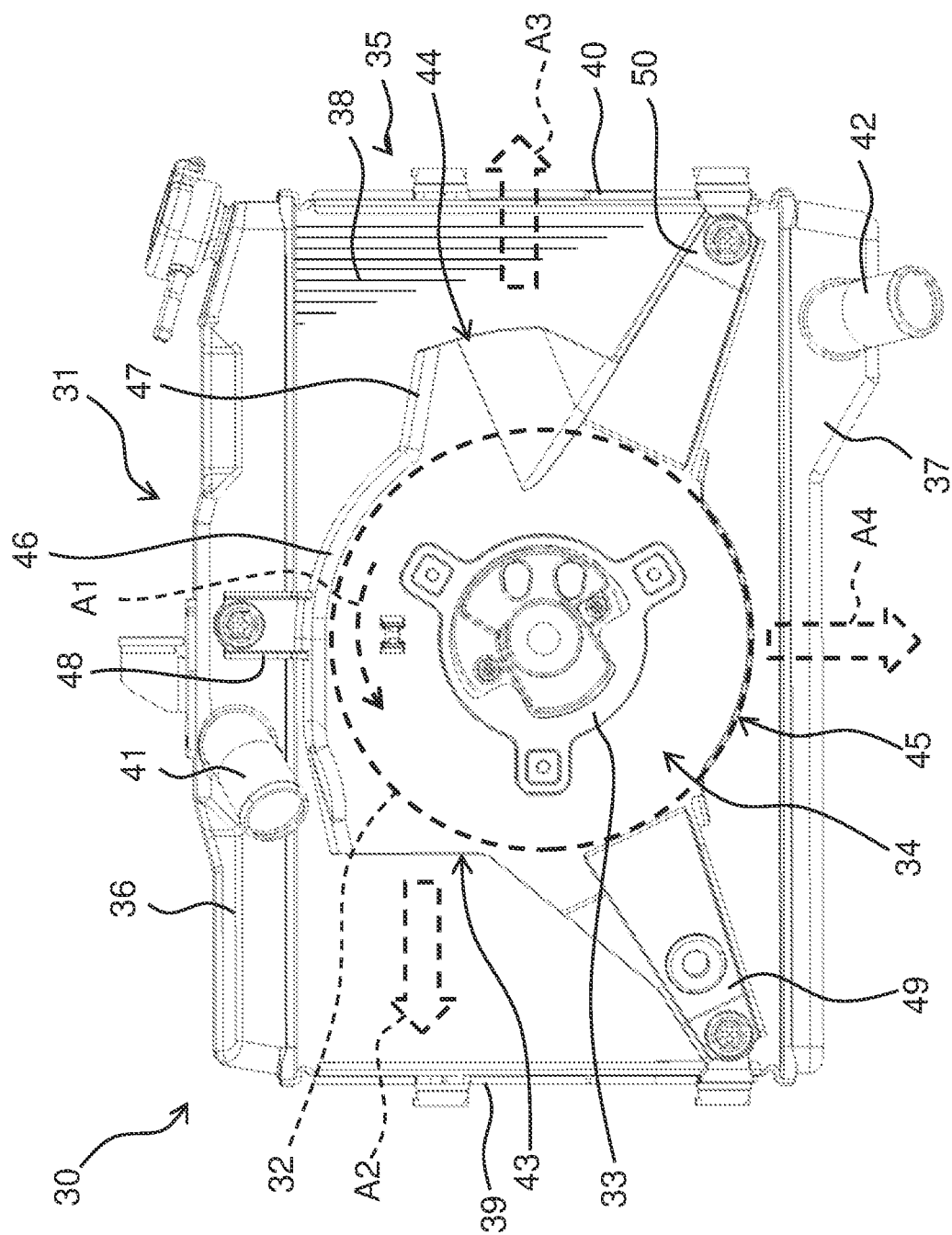
FIG. 3 is a rear view of a radiator unit.
Figure 4:
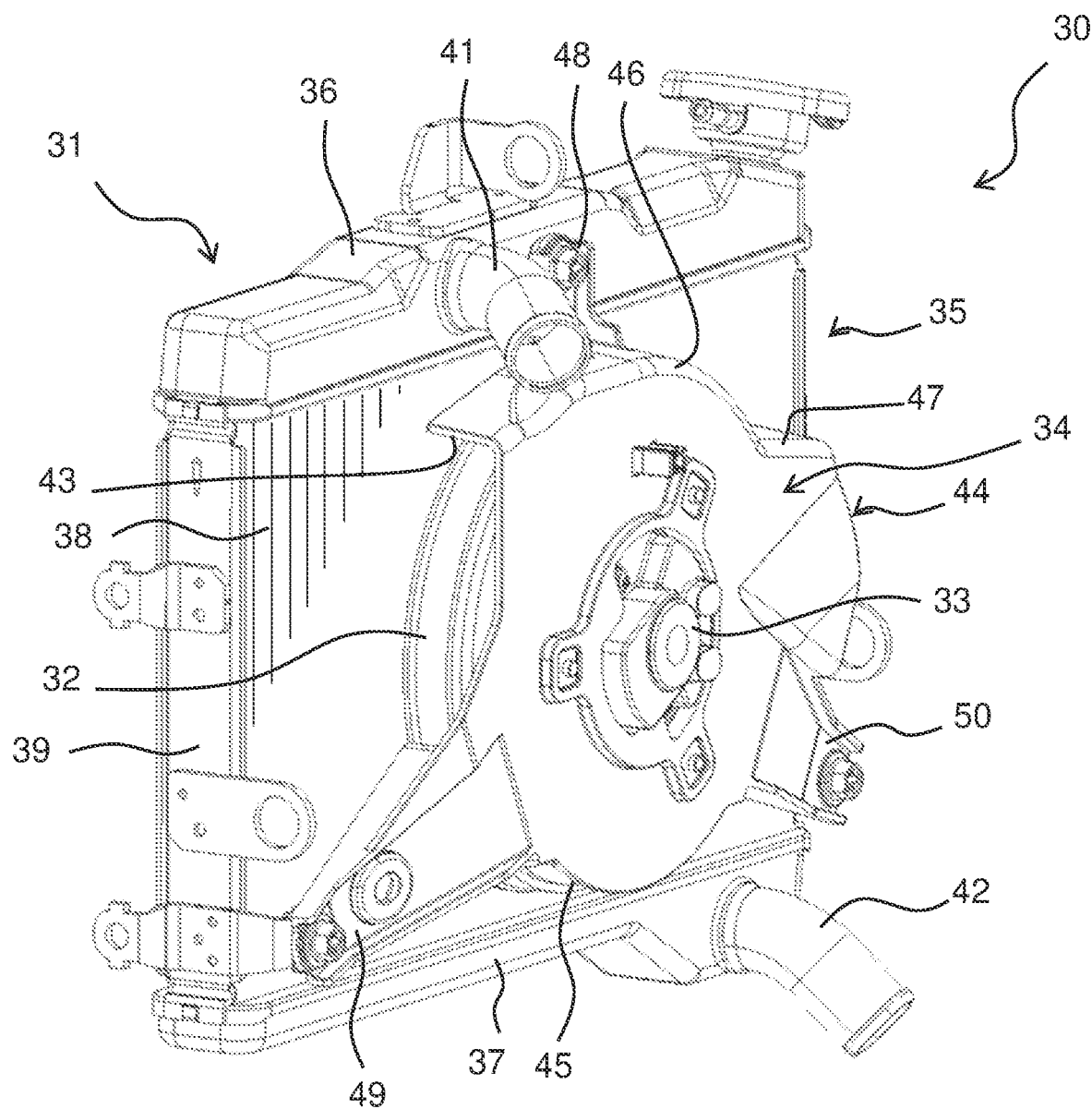
FIG. 4 is a perspective view of the radiator unit.
Figure 5:
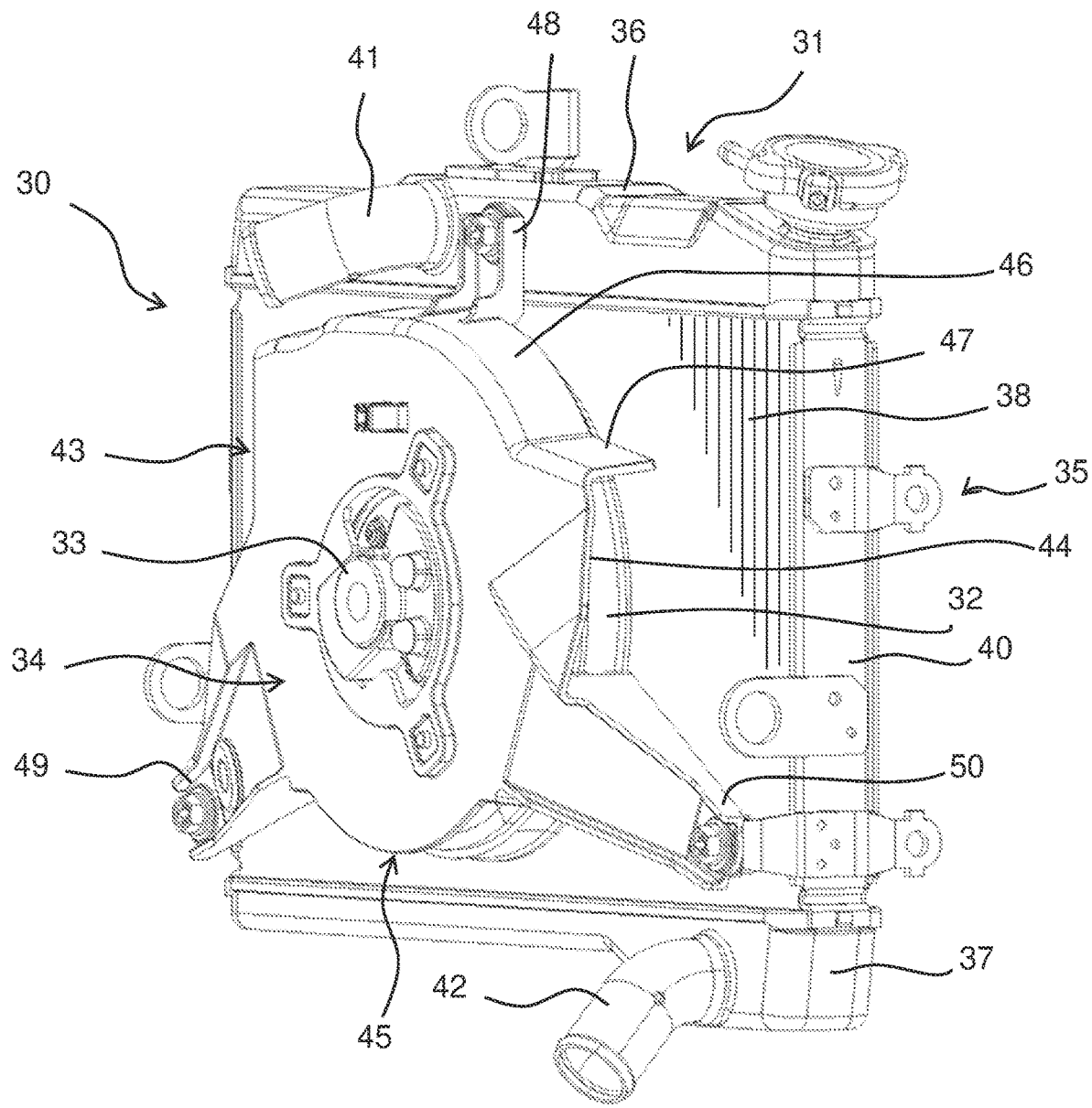
FIG. 5 is another perspective view of the radiator unit.

As shown in FIG. 1, the straddled vehicle 1 includes a radiator unit 30. The radiator unit 30 is disposed behind the front fork 11. The radiator unit 30 is disposed in front of the engine 6. The radiator unit 30 is laterally covered with the first and second side covers 18 and 19. FIG. 3 is arear view of the radiator unit 30. FIGS. 4 and 5 are perspective views of the radiator unit 30. As shown in FIGS. 3 to 5, the radiator unit 30 includes a radiator 31, a radiator fan 32, a fan motor 33, and a fan cover 34.

The radiator 31 cools liquid coolant for the engine 6. As shown in FIGS. 3 to 5, the radiator 31 includes a radiator core 35, an upper tank 36, and a lower tank 37. The radiator core 35 includes a plurality of fins 38 for cooling the liquid coolant, a first core support 39, and a second core support 40. The first and second core supports 39 and 40 support the plural fins 38. The first and second core supports 39 and 40 are disposed on the lateral sides of the fins 38.

The upper tank 36 is disposed above the radiator core 35. An attachment port 41 of a liquid coolant hose is connected to the upper tank 36. The lower tank 37 is disposed below the radiator core 35. An attachment port 42 of the liquid coolant hose is connected to the lower tank 37.

The radiator fan 32 is disposed behind the radiator 31. When rotated, the radiator fan 32 generates a flow of air passing through the radiator 31 from front to rear. The radiator fan 32 is a centrifugal fan. The radiator fan 32 feeds the air, passing through the radiator 31 from font to rear, in a centrifugal direction. The fan motor 33 is disposed behind the radiator fan 32. The fan motor 33 supports the radiator fan 32. The fan motor 33 rotates the radiator fan 32. The fan motor 33 is attached to the fan cover 34. As depicted with arrow A1 in FIG. 3, the fan motor 33 rotates the radiator fan 32 counterclockwise in the vehicle rear view.

The fan cover 34 is disposed behind the radiator fan 32. The fan cover 34 includes a first lateral blowing port 43, a second lateral blowing port 44, and a downward blowing port 45. The first lateral blowing port 43 is disposed on the left lateral surface of the fan cover 34. The air, flowing rearward from the radiator 31, is blown out leftward from the first lateral blowing port 43 as depicted with arrow A2. The second lateral blowing port 44 is disposed on the right lateral surface of the fan cover 34. An upper end of the second lateral blowing port 44 is disposed lower than an upper end of the first lateral blowing port 43. The air, flowing rearward from the radiator 31, is blown out rightward from the second lateral blowing port 44 as depicted with arrow A3. The downward blowing port 45 is disposed on the bottom surface of the fan cover 34. The air, flowing rearward from the radiator 31, is blown out downward from the downward blowing port 45 as depicted with arrow A4.

The fan cover 34 includes a cover body 46, a duct portion 47, a first attachment arm 48, a second attachment arm 49, and a third attachment arm 50. The cover body 46 covers the radiator fan 32. The cover body 46 is in part shaped to curve along the shape of the radiator fan 32. The cover body 46 is a portion to which the fan motor 33 is attached. The duct portion 47 includes the second lateral blowing port 44 described above. The duct portion 47 extends rightward from the cover body 46. The upper surface of the duct portion 47 slants down rightward.

The first to third attachment arms 48 to 50 are attached to the radiator core 35. The first attachment arm 48 extends upward from the cover body 46. The first attachment arm 48 is fixed to the upper tank 36. In the vehicle rear view, the second attachment arm 49 extends from the cover body 46 in a down-left direction. The second attachment arm 49 is fixed to the first core support 39. In the vehicle rear view, the third attachment arm 50 extends from the cover body 46 in a down-right direction. The third attachment arm 50 is fixed to the second core support 40. The first lateral blowing port 43 is located between the first attachment arm 48 and the second attachment arm 49. The second lateral blowing port 44 is located between the first attachment arm 48 and the third attachment arm 50. The downward blowing port 45 is located between the second attachment arm 49 and the third attachment arm 50.

Figure 6:
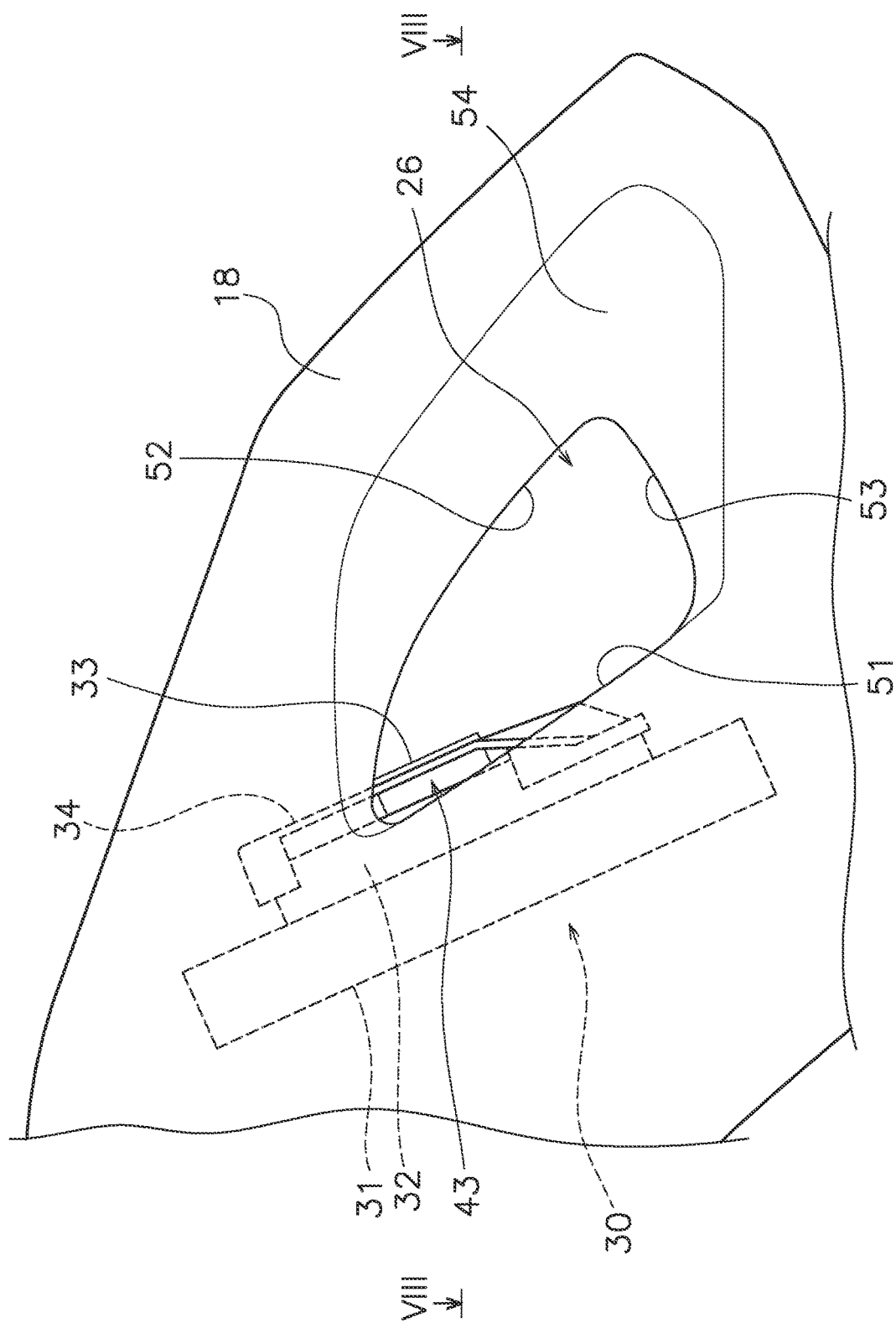
FIG. 6 is an enlarged left side view of the straddled vehicle.

FIG. 6 is an enlarged left side view of the straddled vehicle 1. As shown in FIG. 6, the radiator 31 overlaps the first side cover 18 in the vehicle side view. The radiator 31 is disposed in font of the first opening 26. The radiator 31 is disposed not to overlap the first opening 26 in the vehicle side view. The radiator 31 slants up forward in the vehicle side view. The radiator fan 32 overlaps the first side cover 18 in the vehicle side view. The radiator fan 32 is disposed in front of the first opening 26. The radiator fan 32 is at least in part disposed not to overlap the first opening 26 in the vehicle side view. The fan cover 34 is in part located forward of the first opening 26 and overlaps the first side cover 18. The first lateral blowing port 43 is at least in part located forward of the first opening 26 and overlaps the first side cover 18. The first lateral blowing port 43 at least in part overlaps the first opening 26 in the vehicle side view.

The first opening 26 includes a first front edge 51, a first rear edge 52, and a first lower edge 53. The first front edge 51 slants down rearward. The first lateral blowing port 43 at least in part overlaps the first front edge 51 in the vehicle side view. The first rear edge 52 is located behind the first front edge 51. The first rear edge 52 slants down rearward. The first lower edge 53 slants up rearward. The first side cover 18 includes a first recess 54. The first recess 54 extends rearward from the first opening 26. The first recess 54 continues to the first rear edge 52 and the first lower edge 53.

Figure 7:
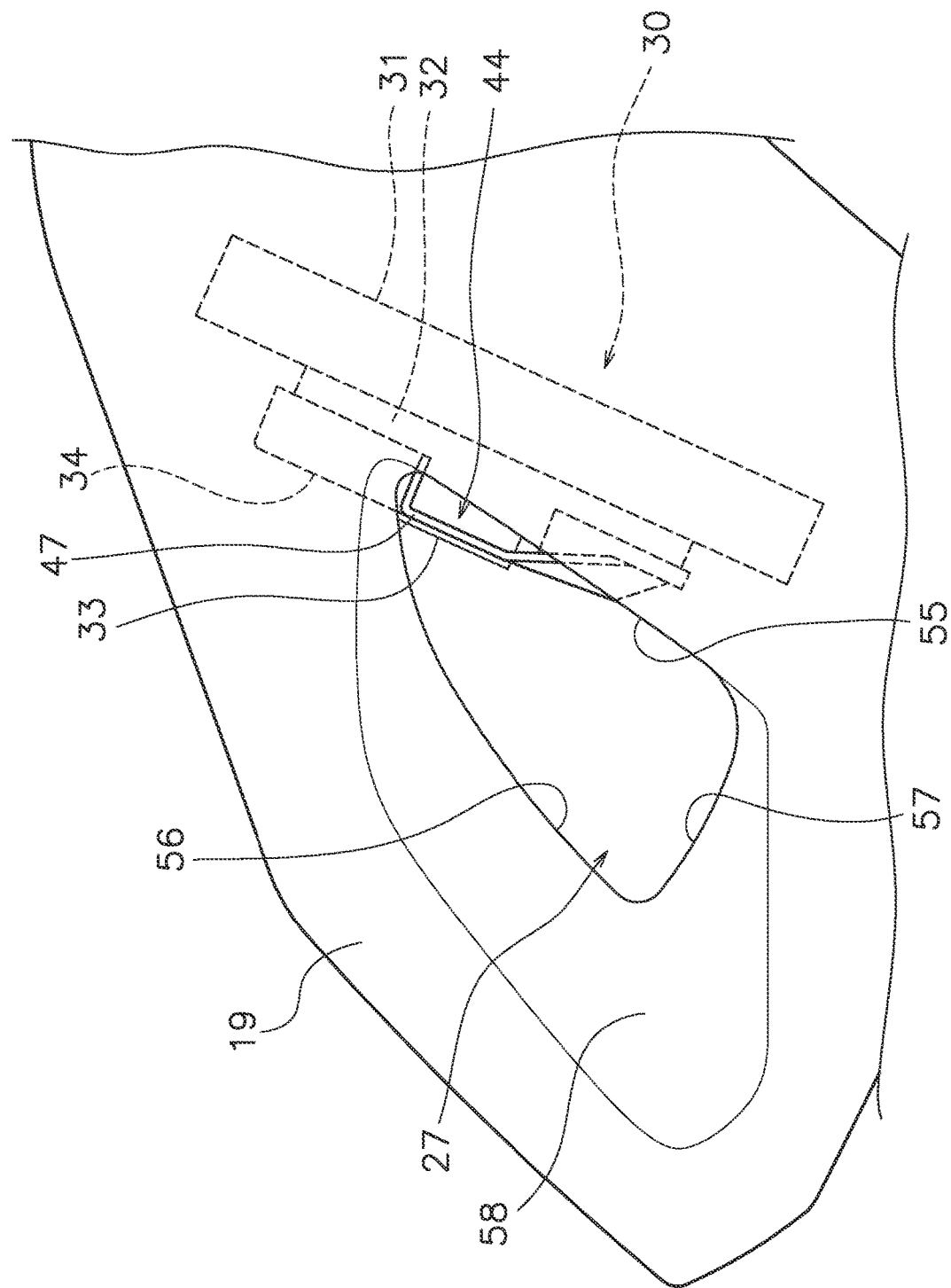
FIG. 7 is an enlarged right side view of the straddled vehicle.

FIG. 7 is an enlarged right side view of the straddled vehicle 1. As shown in FIG. 7, the radiator 31 overlaps the second side cover 19 in the vehicle side view. The second side cover 19 includes a second opening 27. The second opening 27 provided in the second side cover 19 is disposed in a similar position to the first opening 26. The radiator 31 is disposed in font of the second opening 27. The radiator 31 is disposed not to overlap the second opening 27 in the vehicle side view. The radiator fan 32 overlaps the second side cover 19 in the vehicle side view. The radiator fan 32 is disposed in front of the second opening 27. The radiator fan 32 at least in part is disposed not to overlap the second opening 27 in the vehicle side view. The fan cover 34 is in part located forward of the second opening 27 and overlaps the second side cover 19. The duct portion 47 described above extends toward the second opening 27. The duct portion 47 at least in part overlaps the second opening 27 in the vehicle side view. The second lateral blowing port 44 is at least in part located forward of the second opening 27 and overlaps the second side cover 19. The second lateral blowing port 44 at least in part overlaps the second opening 27 in the vehicle side view.

The second opening 27 has a similar shape to the first opening 26. The second opening 27 includes a second front edge 55, a second rear edge 56, and a second lower edge 57. The second front edge 55 slants down rearward. The second lateral blowing port 44 at least in part overlaps the second font edge 55 in the vehicle side view. The second rear edge 56 is located behind the second font edge 55. The second rear edge 56 slants down rearward. The second lower edge 57 slants up rearward. The second side cover 19 includes a second recess 58. The second recess 58 extends rearward from the second opening 27. The second recess 58 continues to the second rear edge 56 and the second lower edge 57.

Figure 8:
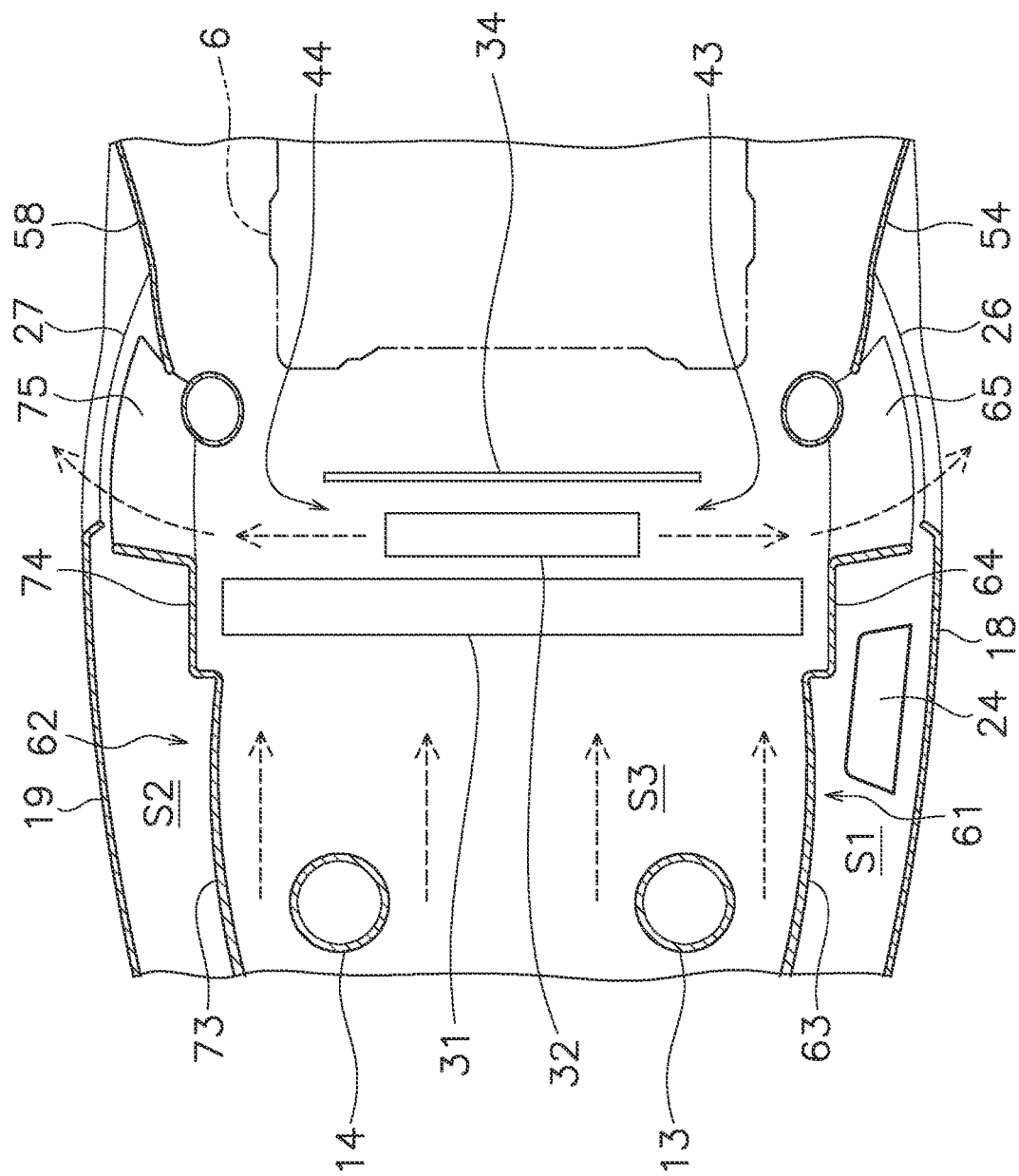
FIG. 8 is a cross-sectional view taken along line VIII-VIII in FIG. 6.

FIG. 8 is a cross-sectional view taken along line VIII-VIII in FIG. 6. As shown in FIG. 8, the straddled vehicle 1 includes a first inner panel 61 and a second inner panel 62. The first inner panel 61 is disposed on the inner side of the first side cover 18 in a vehicle right-and-left direction. The first inner panel 61 is fixed to the inner surface of the first side cover 18. The first inner panel 61 is disposed between the first side cover 18 and the radiator 31. A first accommodation space S1 is produced between the first side cover 18 and the first inner panel 61. The straddled vehicle 1 includes an electrical component 24. The electrical component 24 is disposed in the first accommodation space S1. The electrical component 24 is, for instance, a rectifier/regulator. It should be noted that the electrical component 24 may be any suitable electrical component other than the rectifier/regulator.

The second inner panel 62 is disposed on the inner side of the second side cover 19 in the vehicle right-and-left direction. The second inner panel 62 is fixed to the inner surface of the second side cover 19. The second inner panel 62 is disposed between the second side cover 19 and the radiator 31. A second accommodation space S2 is produced between the second side cover 19 and the second inner panel 62.

The first and second inner panels 61 and 62 extend from forward of the radiator 31 to rearward of the radiator 31 and lead air to the radiator 31 from ahead of the radiator 31. A wind guide pathway S3 is produced between the first and second inner panels 61 and 62. The wind guide pathway S3 is opened toward a vehicle front. The radiator 31 is disposed in the wind guide pathway S3. The air, flowing from ahead of the vehicle, flows through the wind guide pathway S3 and therein passes through the radiator 31. The radiator fan 32 feeds the air, passing through the radiator 31, in centrifugal direction. Accordingly, the air is blown out leftward from the first lateral blowing port 43. The air is blown out rightward from the second lateral blowing port 44. The air is blown out downward from the downward blowing port 45.

Figure 9:
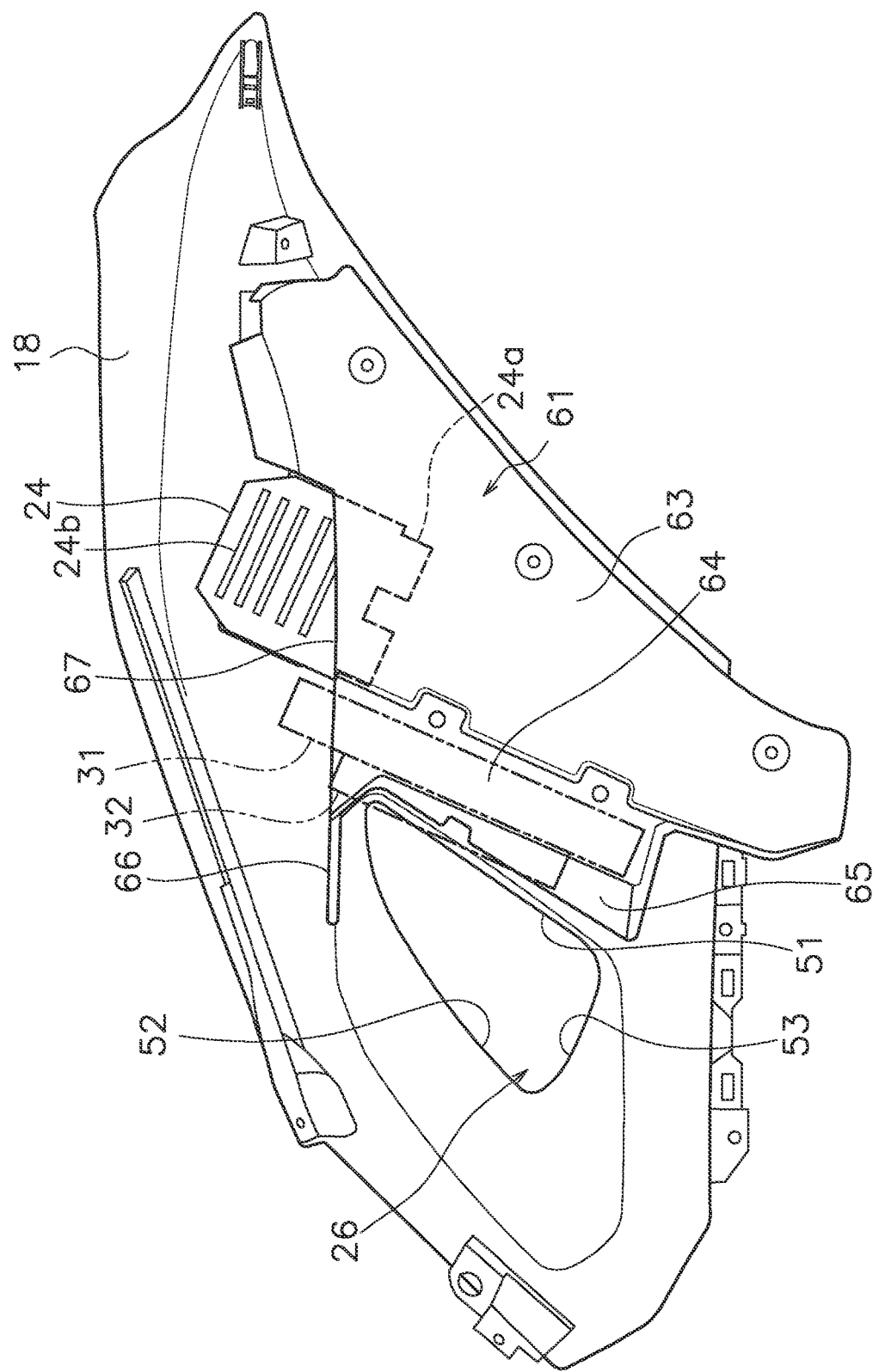
FIG. 9 is a diagram showing the inner surface of a first side cover.

FIG. 9 is a diagram showing the inner surface of the first side cover 18. As shown in FIG. 9, the first inner panel 61 includes a first guide surface 63, a first attachment surface 64, a first slope 65, and a first extending portion 66. The first guide surface 63 is located forward of the radiator 31. The first guide surface 63 leads the air, flowing from ahead of the vehicle, to the radiator 31. The upper surface of the first guide surface 63 is in part provided with a cutout 67. A portion of the electrical component 24 is disposed inside the first accommodation space S through the cutout 67. For example, a connector portion 24a of the electrical component 24 is disposed inside the first accommodation space S1. The other portion of the electrical component 24 is disposed outside the first accommodation space S1 through the cutout 67. For example, heat dissipating fins 24b of the electrical component 24 are disposed outside the first accommodation space S1.

The first attachment surface 64 is disposed behind the first guide surface 63. The first attachment surface 64 is opposed to the radiator 31 in the vehicle right-and-left direction. The radiator 31 is attached to the first attachment surface 64. The first slope 65 is located behind the first attachment surface 64. The first slope 65 is located rearward of the radiator 31. The first slope 65 slants with respect to the vehicle right-and-left direction. The first slope 65 slants rearward and outward in the vehicle right-and-left direction. The first slope 65 is disposed in front of the first opening 26 in the vehicle side view. The first slope 65 is disposed along the first font edge 51. The first slope 65 overlaps at least part of the radiator fan 32 in the vehicle side view. As shown in FIG. 8, the first slope 65 is in part located directly lateral to the first lateral blowing port 43. The first slope 65 leads the air, blown out from the first lateral blowing port 43, to the first opening 26. The first extending portion 66 extends rearward from an upper portion of the first slope 65. The first extending portion 66 is located above the first opening 26.

Figure 10:
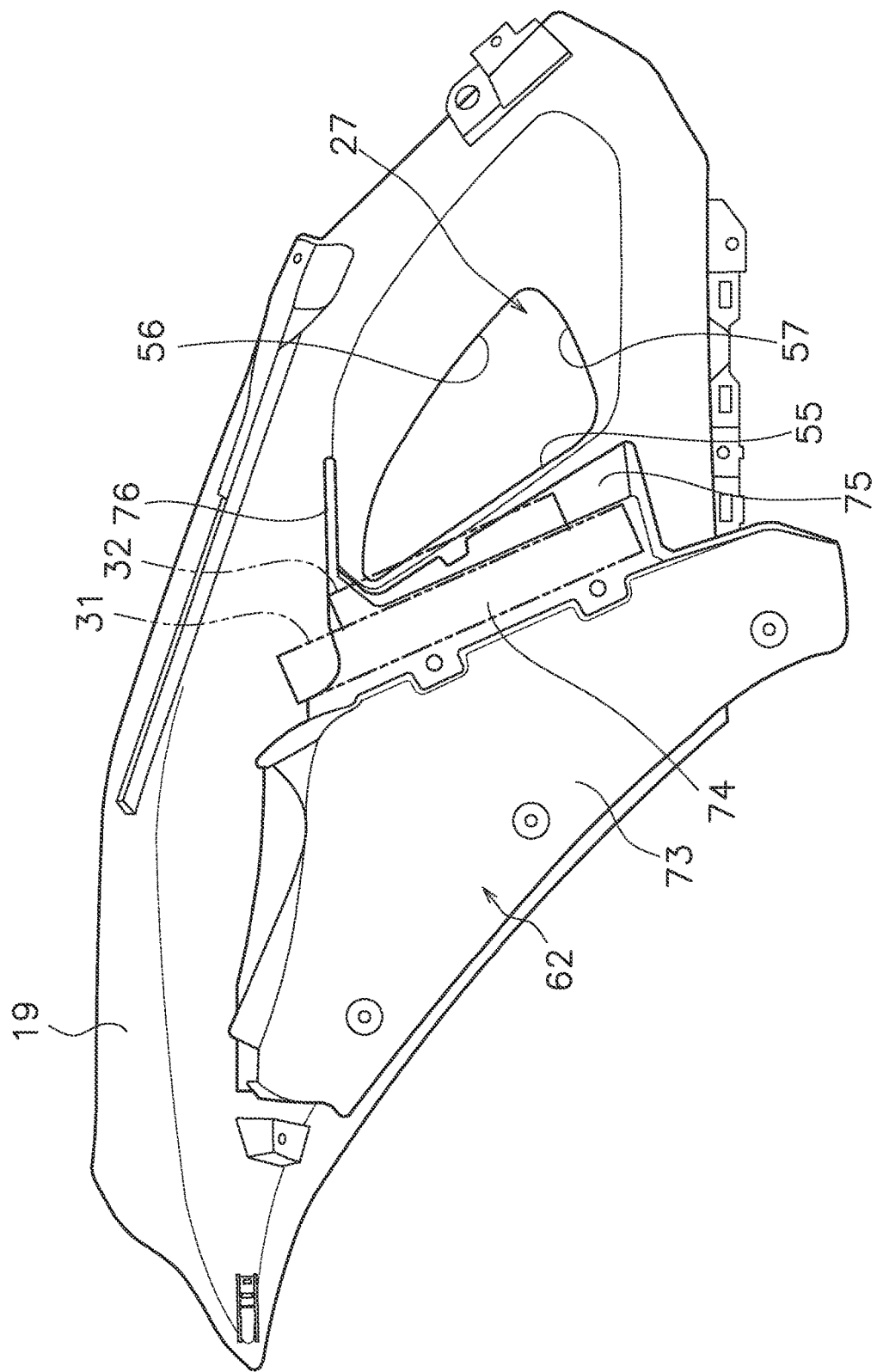
FIG. 10 is a diagram showing the inner surface of a second side cover.

FIG. 10 is a diagram showing the inner surface of the second side cover 19. As shown in FIG. 10, the second inner panel 62 includes a second guide surface 73, a second attachment surface 74, a second slope 75, and a second extending portion 76. The second guide surface 73 is located forward of the radiator 31. The second guide surface 73 leads the air, flowing from ahead of the vehicle, to the radiator 31.

The second attachment surface 74 is disposed behind the second guide surface 73. The second attachment surface 74 is opposed to the radiator 31 in the vehicle right-and-left direction. The radiator 31 is attached to the second attachment surface 74. The second slope 75 is located behind the second attachment surface 74. The second slope 75 is located rearward of the radiator 31. The second slope 75 slants with respect to the vehicle right-and-left direction. The second slope 75 slants rearward and outward in the vehicle right-and-left direction. The second slope 75 is disposed in front of the second opening 27 in the vehicle side view. The second slope 75 is disposed along the second font edge 55. The second slope 75 overlaps at least part of the radiator fan 32 in the vehicle side view. As shown in FIG. 8, the second slope 75 is in part located directly lateral to the second lateral blowing port 44. The second slope 75 leads the air, blown out from the second lateral blowing port 44, to the second opening 27. The second extending portion 76 extends rearward from an upper portion of the second slope 75. The second extending portion 76 is located above the second opening 27.

In the straddled vehicle 1 according to the present embodiment explained above, the air, passing through the radiator 31, gets hot and is blown out sidewards from the first lateral blowing port 43 of the fan cover 34. Because of this, even when an electrical component is disposed behind the radiator 31, the electrical component can be inhibited from being thermally affected. Besides, the hot air, blown out sidewards from the first lateral blowing port 43, is led to the first opening 26 of the first side cover 18 by the first slope 65 of the first inner panel 61. Accordingly, the hot air, passing through the radiator 31, is efficiently discharged to outside through the first opening 26.

Likewise, the hot air, blown out sidewards from the second lateral blowing port 44, is led to the second opening 27 of the second side cover 19 by the second slope 75 of the second inner panel 62. Accordingly, the hot air, passing through the radiator 31, is efficiently discharged to outside through the second opening 27.

Moreover, the first accommodation space S1 is divided from a space located behind the radiator 31 by the first slope 65. Because of this, the hot air, passing through the radiator 31, is prevented from intruding the first accommodation space S1. Accordingly, the electrical component 24, disposed inside the first accommodation space S1, can be inhibited from being thermally affected.

One embodiment of the present invention has been explained above. However, the present invention is not limited to the embodiment described above, and a variety of changes can be made without departing from the gist of the present invention.

The configuration of the straddled vehicle is not limited to that in the embodiment described above and may be changed. For example, the number of front wheels is not limited to one, and alternatively, may be greater than one. The number of rear wheels is not limited to one, and alternatively, may be greater than one. The configuration of the first side cover and that of the second side cover are not limited to those in the embodiment described above and may be changed. For example, the first and second openings 26 and 27 may be changed in position or shape.

The configuration of the first inner panel and that of the second inner panel are not limited to those in the embodiment described above and may be changed. For example, the first and second slopes 65 and 75 may be changed in position or shape. The electrical component 24 may be disposed not in the first accommodation space S1 but in the second accommodation space S2. The configuration of the radiator unit 30 is not limited to that in the embodiment described above and may be changed. For example, the fan cover 34 may be changed in shape. The fan motor 33 may be configured to be rotated clockwise in the vehicle rear view. In this case, the shape of the fan cover 34 may be bilaterally symmetric to that in embodiment described above.

REFERENCE SIGNS LIST

6 Engine
18 First side cover
24 Electrical component
26 First opening
31 Radiator
32 Radiator fan
34 Fan cover
43 First lateral blowing port
46 Cover body
47 Duct portion
61 First inner panel
65 First slope
66 First extending portion
S1 First accommodation space

What is claimed is:

1. A straddled vehicle comprising:
a radiator;
a radiator fan disposed behind the radiator in a front-and-rear direction of the straddled vehicle, the radiator fan being configured to generate air passing through the radiator and flowing rearward from the radiator;
a fan cover disposed behind the radiator fan, the fan cover including a lateral blowing port that is configured to blow out sidewards the air flowing rearward from the radiator;
a side cover covering the radiator laterally, the side cover having an opening formed therein;
an inner panel disposed between the side cover and the radiator, the inner panel substantially overlapping the side cover in a right-and-left direction of the straddled vehicle, to thereby define an accommodation space between the inner panel and the side cover, the inner panel including a slope that
is located rearward of the radiator in the front-and-rear direction of the straddled vehicle,
slants with respect to the right-and-left direction of the straddled vehicle,
is configured to lead the air blown out from the lateral blowing port to the opening in the side cover, and
divides the accommodation space; and
an electrical component disposed in the accommodation space.

2. The straddled vehicle according to claim 1, wherein
   the inner panel extends from forward of the radiator to rearward of the radiator, and
   the inner panel is configured to lead the air to the radiator.

3. The straddled vehicle according to claim 1, wherein
   the lateral blowing port is at least in part located forward of the opening in the side cover in the front-and-rear direction of the straddled vehicle, and at least partially overlaps the side cover in a side view of the straddled vehicle.

4. The straddled vehicle according to claim 1, further comprising:
   an engine, wherein
   the side cover laterally covers at least a part of the engine.

5. The straddled vehicle according to claim 4, wherein
   the opening opens sidewards from the straddled vehicle, and
   the engine is exposed at least partially through the opening in a side view of the straddled vehicle.

6. The straddled vehicle according to claim 1, wherein the lateral blowing port at least partially overlaps the opening in the side cover in a side view of the straddled vehicle.

7. The straddled vehicle according to claim 1, wherein the inner panel further includes an extending portion extending rearward from an upper portion of the slope.

8. The straddled vehicle according to claim 1, wherein the fan cover further includes
   a cover body covering the radiator fan, and
   a duct portion including the lateral blowing port, the duct portion extending from the cover body to the opening in the side cover.

9. The straddled vehicle according to claim 1, wherein the slope overlaps at least a part of the radiator fan in a side view of the straddled vehicle.

\* \* \* \* \*